United States Patent [19]

Eibl et al.

[11] 3,947,246

[45] Mar. 30, 1976

[54] PROCESS FOR PRODUCING SPOTTED DYEINGS WITH PASTES CONTAINING WATER-SOLUBLE RESIN OR WAX AND PARTICULATE DYESTUFF

[75] Inventors: Johannes Eibl, Burscheid-Kaltenherberg; Karlheinz Wolf, Leverkusen, both of Germany; Helmut Prochaska, Warren, N.J.

[73] Assignee: Bayer Aktiengesellschaft, Leverkusen, Germany

[22] Filed: Nov. 21, 1973

[21] Appl. No.: 417,745

[52] U.S. Cl. ................................. 8/62; 8/63; 8/64; 8/83; 8/162 R
[51] Int. Cl.² ............................................ D06P 3/00
[58] Field of Search ............ 8/62, 63, 64, 83, 162 R

[56] References Cited
UNITED STATES PATENTS

| | | | |
|---|---|---|---|
| 3,650,664 | 3/1972 | Graff et al. | 8/62 |
| 3,679,352 | 7/1972 | Mizuma et al. | 8/62 |

*Primary Examiner*—M. J. Welsh
*Attorney, Agent, or Firm*—Plumley & Tyner

[57] ABSTRACT

A process for producing a spotted effect on synthetic fibre materials using dyestuff pastes which contain insoluble or scarcely soluble particles of one or a plurality of dyestuff preparations, said particles having a size of $10\mu$ to $200\mu$, preferable $40\mu$ to $100\mu$ and said dyestuff preparations consisting of a dyestuff, a resin or wax which is insoluble or scarcely soluble in water and optionally of a softener and/or tenside.

9 Claims, No Drawings

PROCESS FOR PRODUCING SPOTTED DYEINGS WITH PASTES CONTAINING WATER-SOLUBLE RESIN OR WAX AND PARTICULATE DYESTUFF

The present invention relates to a process for dyeing synthetic fibre materials so as to produce a spotted effect, characterized in that dyestuff pastes are used which contain insoluble or scarcely soluble particles of one or a plurality of dyestuff preparations, said particles having a size of $10\mu$ to $200\mu$, preferably $40\mu$ to $100\mu$ and said dyestuff preparations consisting of a dyestuff, a resin or wax which is insoluble or scarcely soluble in water and optionally of softeners and/or tensides.

The dyestuff pastes are preferably print pastes, in particular aqueous print pastes, and contain in addition the customary auxiliary agents, e.g. as print paste thickeners all commercially available products suitable for printing synthetic fibres: emulsion thickeners with and without binding agents are likewise suitable. Possible resin or wax components for the manufacture of dyestuff preparations are all natural or synthetic resins or waxes which are at room temperature, i.e. about 25°C, practically insoluble in water; for example polyethylene and polypropylene waxes, styrene-acrylontrile resins, maleinate resins, polyamide resins, ketone resins, (colophony) rosins or resins with a substantial proportion of rosin, PVC resins, vinyl chloride or vinylene chloride copolymers, cellulose ether, cellulose ester, copolymers from PVC or polyvinylacetate or mixtures of these resins. A large number of these resins and waxes is given in the table of lacquer raw materials compiled by Erich Karsten (Publisher: R. Vincentz, Hannover) and in Ullmann's Enzyklopadie der technischen Chemie, volume 8, pages 393 to 448; volume 18, pages 262 to 305. The resins or waxes are used in amounts of 10 % to 300 %, preferably 20 % to 1500 %, based on the dyestuff. Resins or waxes are preferred with softening points above 50°C.

Possible softeners are, for example, phosphoric acid ester and phthalic acid ester, such as trioctyl phosphate, dibutyl phthalate, dioctyl phthalate.

As tensides there may be used nonionic, anionic or cationic tensides, in particular ethylene oxide adducts or propylene oxide adducts to alkyl phenols, alkyl alcohols or long chain carboxylic acids as well as condensation products from naphthaline, formaldehyde and $H_2SO_4$, amines and ammonium salts, in particular long-chain or cyclic amines or their salts.

The dyestuff preparations may contain 0.1 to 50 %, based on the dyestuff, of softeners and/or tensides.

As dyestuffs there may be mentioned in particular dispersion dyestuffs, especially azo and anthraquinone dyestuffs such as those described for example in the Colour-Index, 3rd Edition (1971), volume 2, pages 2479 to 2742 or in Ullmann's Enzyklopadie der technischen Chemie, volume 4, pages 128 et seq., and volume 3, pages 726 et seq.. Those dyestuffs are preferred which sublimate below 200°C.

The manufacture of dyestuff preparations is advantageously carried out by kneading the dyestuffs with natural or synthetic resins or waxes with the addition, if desired, of softeners and/or tensides at kneading temperatures which should be so high that a viscous, kneadable composition is obtained. In general, the temperature lies between 80° and 150°C. After kneading the mixture is cooled, ground to the required particle size and optionally screened. In this process all resins or waxes can be used which form a viscous, kneadable composition when mixed with the dyestuffs and optionally softeners and/or tensides at 50° to 180°C, preferable 70° to 140°C, and which do not stick to one another on cooling to room temperature. The dyestuffs can also be dissolved or dispersed by stirring into the resins or waxes rendered liquid by heating. The manufacture of particles $10\mu$ to $200\mu$ in size, preferably $40\mu$ to $100\mu$, can proceed according to methods known per se, e.g. by grinding and screening the dyestuff preparations, by granulating or spraying the dyestuff preparations liquefied by heating or by spray-drying the dispersions or solutions of the dyestuff preparations.

The manufacture of the novel dyestuff preparations can also be carried out, however, by introducing a solution or dispersion of the resin or wax into a preferably aqueous solution or dispersion of the dyestuff, optionally in the presence of softeners and/or tensides, and subsequently by precipitating or flocking the resin or wax so that primarily the surface of the dyestuff is covered with the resin or wax. Possible resin solutions are, for example, alkaline solutions of resins with COOH groups, such as, for example, saponifiable maleic resins which precipitate gain upon acidification or addition of alkaline earth metal salts. Possible synthetic resin dispersions are, for example, dispersions of PVC, polyethylene, polyvinyl acetate, polyacrylic acid ester, polyvinylidene chloride, polystyrene-butadiene compounds or copolymers from PVC and polyvinyl acetate, which are adsorbed at the dyestuff surface and/or precipitate simultaneously with the dyestuff or which can be flocked according to known methods e.g. acidification. The dyestuff dispersion or solution, however, can be concentrated by evaporation together with the synthetic resin dispersion or, for example, spray dried. The dyestuff preparations can also be obtained by manufacturing the resins or waxes in the presence of the dyestuffs or the dyestuffs in the presence of the resins or waxes.

The pulverulent dyestuff preparation is stirred into a print paste thickener, e.g. into a 10 % solution of a locust bean flour ether. Thereafter, the required white or pre-dyed substrates are printed, impregnated or coated (with a doctor blade) with this preparation, then dried and fixed by means of hot air or an inert gas at a temperature between 170° and 200°C for a period of 1 to 3 minutes. In addition, the fixing can also be carried out with water vapour at atmospheric pressure, but preferably at excess pressure. In this instance the fixing time lies between 15 and 60 minutes. After the thickener has been removed by washing a dyed spotted effect is obtained on undyed or dyed substrate. It is also possible to print a plurality of dyestuff preparations with different coloured dyestuffs under the same conditions so that spots of different shades are obtained.

Suitable substrates are fabrics, knitted fabrics, foils, fleeces and the like from aromatic polyesters, synthetic superpolyamides, cellulose esters etc.

Further details of the process according to the invention will be given in the following with reference to the Examples.

Examples

A. Manufacture of the dyestuff preparations:
1. A mixture consisting of 45.0 parts of dyestuff of the following constitution

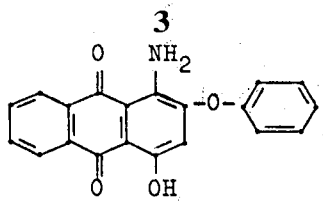

5.0 parts of an ethylene oxide adduct, prepared from 10 mol of ethylene oxide and 1 mol of nonyl phenol, 4.0 parts of an ethylene oxide adduct, prepared from 5 mol of ethylene oxide and 1 mol of nonylphenol, 10.0 parts of ethyl cellulose, 35.8 parts of a maleinate resin with an acid number of 190 to 220 and 0.2 parts of 2,2'-methylene-bis-(4-methyl-6-tert.-butylphenol)

is kneaded in a heatable dispersion kneader of the Werner and Pfleiderer system for 2 to 3 hours at 80°C to 100°C.

The kneading process is carried out by heating up the kneader at the start so that a viscous, kneadable composition is obtained which is then kneaded for 2 to 3 hours at a temperature of 80° to 100°C. In order to be able to keep working at this temperature the kneader may possibly be have to cooled down again due to heat generated within the apparatus. A dyestuff preparation is obtained which is ground after cooling to room temperature to a partical size of 40 to 100μ. Any smaller or larger particles which may be produced during grinding are screened off.

2. As in Example 1 a dyestuff preparation is produced from
   45 parts of the dyestuff described in Example 1,
   4 parts of an ethylene oxide adduct, prepared from 6 mol of ethylene oxide and 1 mol of nonylphenol,
   5 parts of an ethylene oxide adduct, prepared from 10 mol of ethylene oxide and 1 mol of nonylphenol and
   46 parts of a styrene-acrylonitrile copolymer with an acrylonitrile content of approx. 30 %.
   The mixture is kneaded for a period of 2 to 3 hours at 90° to 120°C.

3. As in Example 1 a dyestuff preparation is produced from
   50 parts of the dyestuff described in Example 1,
   15 parts of trioctyl phosphate and
   35 parts of a polyethylene wax with a molecular weight of approx. 2.000 and a dropping point of about 103° to 107°C.

4. A dyestuff preparation is produced as in Example 2 except that cellulose acetobutyrate is used instead of the styrene-acrylonitrile copolymer.

5. As in Example 1 a dyestuff preparation is produced from 50 % of the dyestuff described in Example 1 and from 50 % of a maleinate resin with an acid number of 190 to 220.

6. As in Example 1 a dyestuff preparation is produced from 50 % of the dyestuff described in Example 1 and 50 % of the polyethylene wax described in Example 3.

7. 24 g of a sponifiable maleinate resin (acid number 210, melting point 110° to 120°C) are dissolved in 60 ml of water and 24 ml of a 40 % by volume sodium hydroxide solution at 60° to 90° C. This solution is added to an aqueous dispersion of 125 g of the dyestuff described in Example 1. After stirring for one hour the mixture is slowly acidified with dilute acetic acid whilst stirring, then filtered off by suction and washed until neutral. After drying the pigment preparation is ground as in Example 1 to a particle size of 40 to 100μ

8. A dyestuff preparation is produced as in Example 7 except that the dyestuff dispersion is ground to a particle size of less than 1μ prior to acidification in a usual wet crushing aggregate, e.g. in a rapidly operating pebble mill equipped with a stirrer which contains glass pearls 0.3 to 0.5 mm in diameter as the grinding elements.

9. A dyestuff preparation is produced as in Example 8 except that 6 g of N-cyclohexyl propylene diamine-1,3 are also added to the resin solution.

10. Dyestuff preparations are produced as in Examples 1 to 9 but instead of the dyestuffs described there, dyestuffs of the following formula are used:

a) 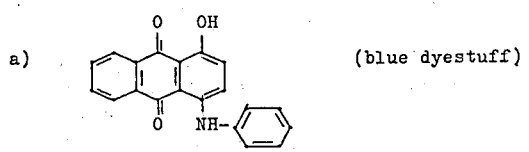 (blue dyestuff)

b) 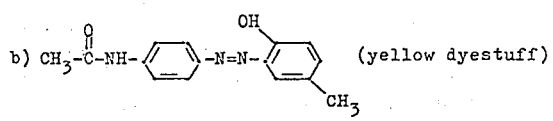 (yellow dyestuff)

c)  (violet dyestuff)

d) 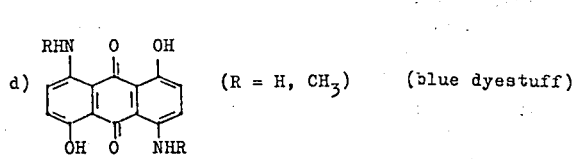 (R = H, CH₃) (blue dyestuff)

e) 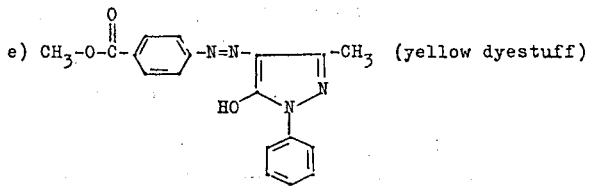 (yellow dyestuff)

B. Production of spotted effects on fibre material:

1. 30 g of the dyestuff preparation described in Example A 3 are introduced into 500 g of a locust bean flour ether, stirred and mixed with 470 ml of water. The resulting print paste is then printed onto a polyester fabric. The print is then dried, fixed by means of hot air for 3 minutes at 170°C or for 1 minute at 200°C and washed. A print is obtained with a red spotted effect.

Similar effects are achieved when a polyamide fabric or a triacetate fabric is used instead of the polyester fabric, 100 g/kg of print passte of a synthetic thickener of the polymaleinate type or polyacrylic acid amide type in the form of a benzine-free aqueous amulsion instead of the locust bean flour ether and/or fixing by means of overheated water vapour at 170° or 190°C for 3 or 1 minute or steam vapour of 1 to 1.5 atms for 30 to 20 minutes.

2. The prints are produced with a spotted effect as in Example 1. The dyestuff preparations 1, 2, 4, 5, 6, 7, 8, 9, 10 described under A) are each used as dyestuff preparations.

3. Prints are produced as in Example 1. For the dyestuff preparation there are used 10 g of the red dyestuff preparation, produced according to Example A 3, 10 g of the yellow dyestuff preparation, produced according to Example A 10 (b) and 10 g of the blue dyestuff preparation produced according to Example A 10 (a). In this way prints are obtained with different coloured spots.

4. As in Example 1 A a dyestuff preparation is produced from 50 parts of a dyestuff of the formula

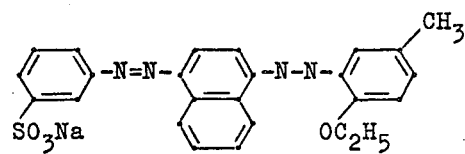

and 50 parts of a polyamide resin with a softening point of 95° to 100°C (e.g. VERSAMID$^{(R)}$ 950) and as in Example 1 B printed on cellulose acetate or cellulose triacetate. The fixing is carried out by means of steam pressure at 1 atm. for 20 minutes.

5. A dyestuff preparation is produced as in Example 1 A from 50 parts of a 1,2-chromium complex dyestuff of

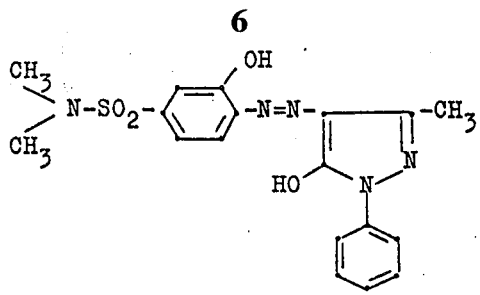

and 50 parts of a ketone resin with a softening point of 75° to 90°C and printed as in the aforegoing Example 4.

We claim:

1. A process for dyeing synthetic fibre materials so as to produce a spotted effect, characterized in that the synthetic fibre materials are printed, impregnated, sprayed or coated with dyestuff pastes, then dried, subjected to a thermofixation process and washed, said dyestuff pastes containing insoluble or scarcely soluble particles of one or a plurality of dyestuff preparations, said particles having a size of $10\mu$ to $200\mu$, and said dyestuff preparations consisting of a dyestuff, a resin or wax which is insoluble or scarcely soluble in water and optionally of a softener and/or tenside.

2. The process according to claim 1, characterized in that dyestuff preparations are used which are obtained by kneading dyestuffs with resins or waxes which are practically insoluble in water at room temperature and subsequently by grinding and optionally by screening.

3. The process according to claim 1, characterized in that dyestuff preparations are used which are produced by precipitating, flocking or evaporating of a resin solution or resin or wax dispersion in the presence of a dyestuff.

4. The process according to claim 1, characterized in that dispersion dyestuffs are used as dyestuffs.

5. The process according to claim 1, characterized in that styrene acrylonitrile copolymers or maleinate resins are used as resins.

6. The process according to claim 1, characterized in that polyethylene or polypropylene is used as wax.

7. Synthetic fibre materials which are dyed according to the process of claim 1.

8. Printing pastes for producing a spotted effect on synthetic fibre materials as they are characterized in claim 1.

9. The process of claim 1 characterized in that said dyestuffs have a particle size of $40\mu$ to $100\mu$.

* * * * *